United States Patent
Jun et al.

(10) Patent No.: US 10,887,616 B2
(45) Date of Patent: Jan. 5, 2021

(54) IMAGE PROCESSING DEVICES HAVING ENHANCED FRAME BUFFER COMPRESSORS THEREIN

(71) Applicant: Samsung Electronics Co., Ltd., Suwon-si (KR)

(72) Inventors: Sung Ho Jun, Hwaseong-si (KR); Sung Ho Roh, Seoul (KR); Hyuk Jae Jang, Suwon-si (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 16/521,147

(22) Filed: Jul. 24, 2019

(65) Prior Publication Data

US 2020/0177902 A1 Jun. 4, 2020

(30) Foreign Application Priority Data

Nov. 30, 2018 (KR) .................. 10-2018-0152586

(51) Int. Cl.
| | |
|---|---|
| *H04N 5/92* | (2006.01) |
| *H04N 19/46* | (2014.01) |
| *H04N 19/13* | (2014.01) |
| *H04N 19/50* | (2014.01) |
| *H04N 19/70* | (2014.01) |
| *H04N 19/103* | (2014.01) |
| *H04N 19/146* | (2014.01) |
| *H04N 19/124* | (2014.01) |
| *H04N 5/917* | (2006.01) |

(52) U.S. Cl.
CPC ........... *H04N 19/46* (2014.11); *H04N 19/103* (2014.11); *H04N 19/124* (2014.11); *H04N 19/13* (2014.11); *H04N 19/146* (2014.11); *H04N 19/50* (2014.11); *H04N 19/70* (2014.11)

(58) Field of Classification Search
CPC .. G06F 11/1004; G06F 11/10; G06F 11/1076; H03M 13/09; H03M 13/091
USPC ....... 386/328, 326, 329, 330, 332, 264, 268, 386/263
See application file for complete search history.

(56) References Cited

U.S. PATENT DOCUMENTS

| | | |
|---|---|---|
| 6,201,834 B1 | 3/2001 | Zhu |
| 6,519,733 B1 | 2/2003 | Har et al. |
| 7,231,587 B2 | 6/2007 | Novotny et al. |

(Continued)

FOREIGN PATENT DOCUMENTS

JP 2013-239893 11/2013

*Primary Examiner* — Robert Chevalier
(74) *Attorney, Agent, or Firm* — Myers Bigel, P.A.

(57) ABSTRACT

An image processing device includes a frame buffer compressor, which is configured to: (i) compress source data into compressed data having CRC bits appended thereto, and (ii) decompress the compressed data into output data and use the CRC bits to check for errors in the output data. A multimedia device is provided, which is configured to generate the source data in response to raw data. A memory device is provided, which is configured to store the compressed data. The frame buffer compressor may include an encoder configured to compress the source data into the compressed data with the CRC bits appended thereto, and a decoder configured to decompress the compressed data into the output data. The encoder may include a prediction module, which is configured to generate prediction data including reference data and residual data, from the source data.

20 Claims, 10 Drawing Sheets

(56) References Cited

U.S. PATENT DOCUMENTS

| | | |
|---|---|---|
| 8,074,146 B2 | 12/2011 | Mead |
| 8,194,736 B2 | 6/2012 | Youn |
| 8,300,959 B2 | 10/2012 | Ahn et al. |
| 9,204,167 B2 | 12/2015 | Boyce et al. |
| 9,299,166 B2 | 3/2016 | Lachine et al. |
| 9,349,156 B2 | 5/2016 | Croxford et al. |
| 2014/0085417 A1* | 3/2014 | Shi .................. H04N 19/61 348/43 |
| 2014/0192075 A1 | 7/2014 | Stamoulis et al. |
| 2016/0165230 A9 | 6/2016 | Srinivasan et al. |
| 2018/0027096 A1 | 1/2018 | Michael et al. |
| 2019/0391869 A1* | 12/2019 | Gopal .................. H03M 7/3086 |

\* cited by examiner (Block size : 16 x 16 (Pixel x Pixel)
Format : YUV 420
Pixel depth : 8 bit
Mode : Separation mode)

| Header Index | Compressed Size (byte) | Compression rate (%) |
|---|---|---|
| 1 | 0~32 | 87.5~100 |
| 2 | 33~64 | 75~87.5 |
| 3 | 65~96 | 62.5~75 |
| 4 | 97~128 | 50~62.5 |
| 5 | 129~160 | 37.5~50 |
| 6 | 161~192 | 25~37.5 |
| 7 | 193~224 | 12.5~25 |
| 0 | 225~256 | 0~12.5 |

FIG. 9
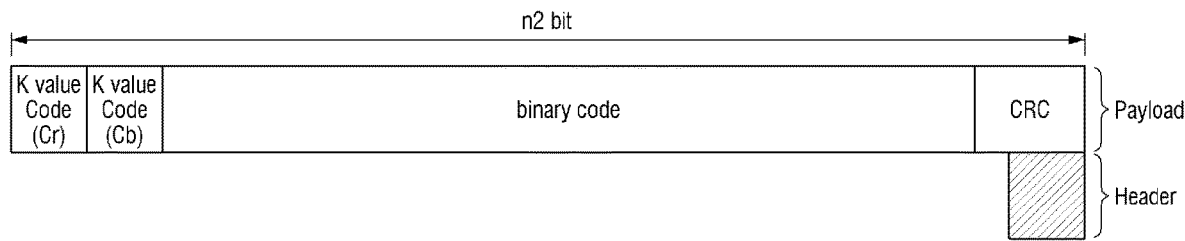
FIG. 10
Block size : 16 x 8 (Pixel x Pixel)
Format : YUV 420
Pixel depth : 8 bit
Mode : Partial Concatenation mode
| Header Index | Compressed Size (byte) | Compression rate (%) |
|---|---|---|
| 1 | 0~32 | 75~100 |
| 2 | 33~64 | 50~75 |
| 3 | 65~96 | 25~50 |
| 0 | 97~128 | 0~25 |
FIG. 11
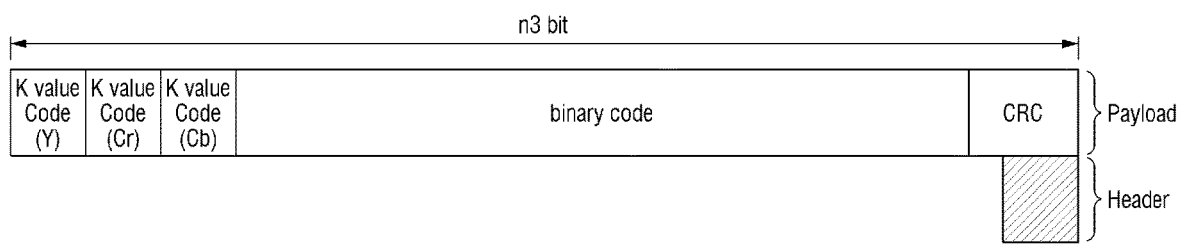

IMAGE PROCESSING DEVICES HAVING ENHANCED FRAME BUFFER COMPRESSORS THEREIN

REFERENCE TO PRIORITY APPLICATION

This application claims priority to Korean Patent Application No. 10-2018-0152586, filed Nov. 30, 2018, the disclosure of which is hereby incorporated herein by reference in its entirety.

BACKGROUND

1. Field of the Disclosure

The present disclosure relates to image processing devices and methods of operating same.

2. Description of the Related Art

Because of the increasing need for high-definition and high-frame rate videos, the bandwidth of data transfer between multimedia devices and memory has substantially increased. With this bandwidth increase, a processing capability of a conventional image processing device may reach a limit, and video recording and playback rates may be reduced. Accordingly, methods of compressing a data size when multimedia devices access a memory is important. For example, it is now possible to compress data before writing the data into the memory and to decompress compressed data before reading the data from the memory, in order to support high bandwidth data transfers.

SUMMARY

Aspects of the present disclosure provide an image processing device having increased processing speed.

It should be noted that objects of the present disclosure are not limited to the above-described objects, and other objects of the present disclosure will be apparent to those skilled in the art from the following descriptions.

According to an exemplary embodiment of the present inventive concept, there is provided an image processing device. The image processing device includes a multimedia Intellectual property (IP) device configured to generate source data by processing raw data and receive and use output data. A frame buffer compressor is provided, which is configured to compress the source data into compressed data and decompress the compressed data into the output data. A memory is provided, which is configured to store the compressed data and to be accessed by the multimedia device. The frame buffer compressor is further configured to add a cyclic redundancy check (CRC) bit to an end of the compressed data and verify an error of the output data.

According to another exemplary embodiment of the present inventive concept, there is provided an image processing device. The image processing device includes a multimedia Intellectual property (IP) device configured to generate source data by processing raw data and receive and use output data. A frame buffer compressor is provided, which is configured to compress the source data into compressed data and decompress the compressed data into the output data. A memory is provided, which is configured to store the compressed data and be accessed by the multimedia IP device. The frame buffer compressor may operate in a lossy mode or a lossless mode, wherein the compressed data compressed in the lossless mode includes a first payload and a first header in which a header index indicating a compression rate of the first payload is recorded. The compressed data that is compressed in the lossy mode includes only a second payload compressed according to a fixed compression rate, and the first and second payloads include first and second CRC bits, respectively. A position of the first CRC bit may vary according to the header index, and a position of the second CRC bit may be fixed.

According to another exemplary embodiment of the present inventive concept, there is provided a frame buffer compressor. The frame buffer compressor includes an encoder, which is configured to receive and compress source data into compressed data, and a decoder, which is configured to decompress the compressed data and generate output data. The encoder may include a prediction module configured to represent prediction data including reference data and residual data as the source data, an entropy encoding module, which is configured to compress the prediction data according to a k value by entropy encoding the prediction data, and output first compressed data. A cyclic redundancy check (CRC) module is also provided, which is configured to add a CRC bit to an end of the first compressed data. The decoder includes an entropy decoding module configured to entropy decode the compressed data according to the k value and output first output data. A prediction compensation module is provided, which is configured to restore the output data using the reference data and the residual data included in the first output data, and a CRC check module is provided, which is configured to generate a comparative CRC bit by performing a calculation on the output data and compare the comparative CRC bit with the CRC bit.

According to a further embodiment of the inventive concept, an image processing device is provided with a frame buffer compressor, which is configured to compress source data into compressed data having cyclic redundancy check (CRC) bits appended thereto, and further configured to decompress the compressed data into output data and use the CRC bits to check for errors in the output data. A multimedia device is further provided, which is configured to generate the source data in response to raw data, and a memory device is provided, which is configured to store the compressed data. The frame buffer compressor may include an encoder configured to compress the source data into the compressed data with the CRC bits appended thereto, and a decoder configured to decompress the compressed data into the output data. In particular, the encoder may include a prediction module, which is configured to generate prediction data including reference data and residual data, from the source data. The encoder may also include an entropy encoding module, which is configured to compress the prediction data according to a k value by entropy encoding the prediction data to thereby generate first compressed data, and a CRC module, which is configured to generate the CRC bits in response to the source data and append the CRC bits to the first compressed data.

According to additional embodiments of the invention, the encoder may further include a first mode selector, which is configured to select whether the source data is to be compressed in a lossy mode or a lossless mode, and a quantization module configured to quantize the prediction data using a predetermined quantization parameter. In some embodiments of the invention, the prediction data is transmitted to the quantization module and then to the entropy encoding module when the source data is being compressed in the lossy mode, but skips the quantization module when the source data is being compressed in the lossless mode.

BRIEF DESCRIPTION OF THE DRAWINGS

The above and other aspects and features of the present disclosure will become more apparent by describing in detail exemplary embodiments thereof with reference to the attached drawings, in which:

FIG. 9 is a diagram illustrating a structure of data compressed without loss by the image processing device according to some exemplary embodiments of the present disclosure;

FIG. 10 is a table illustrating a compression method of the lossless compressed data of FIG. 9;

FIG. 11 is a diagram illustrating a structure of data compressed without loss by the image processing device according to some exemplary embodiments of the present disclosure;

DETAILED DESCRIPTION OF THE EMBODIMENTS

Hereinafter, an image processing device according to some exemplary embodiments of the present disclosure will be described with reference to FIGS. 1 to 19.

Figure 1:
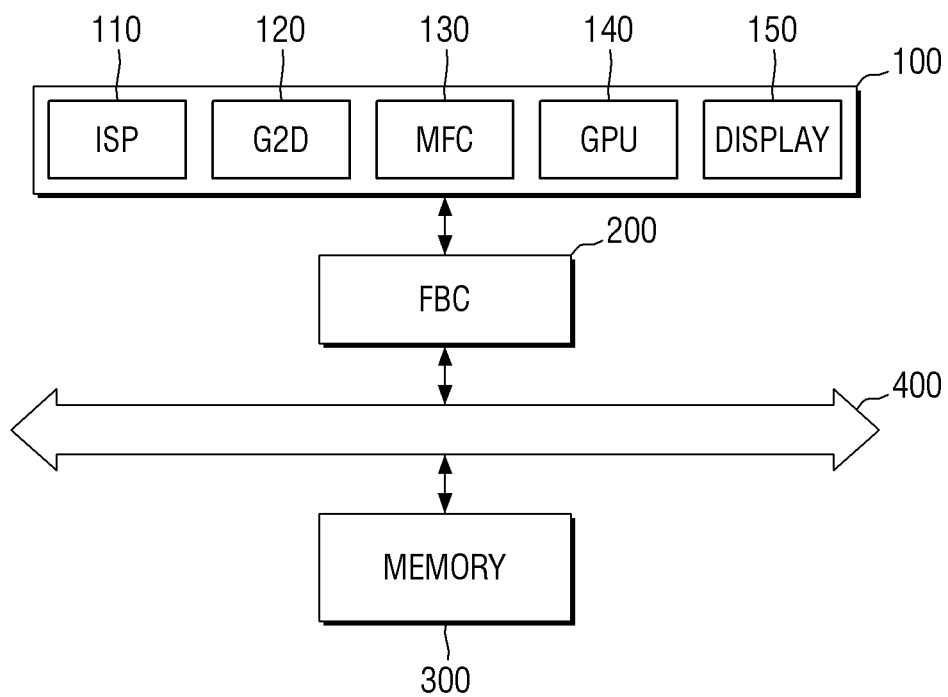
FIG. 1 is a block diagram illustrating an image processing device according to some exemplary embodiments of the present disclosure.
Figure 2:
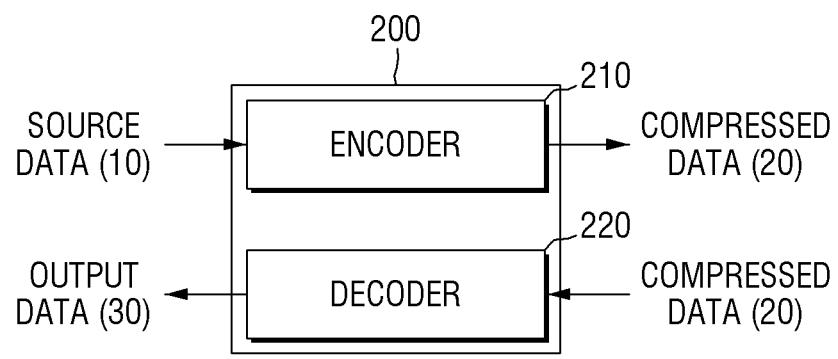
FIG. 2 is a block diagram illustrating a frame buffer compressor of FIG. 1 in detail.

FIG. 1 is a block diagram illustrating an image processing device according to some exemplary embodiments of the present disclosure, and FIG. 2 is a block diagram illustrating a frame buffer compressor of FIG. 1 in detail.

Referring to FIGS. 1 and 2, an image processing device according to some exemplary embodiments of the present disclosure includes multimedia Intellectual property (IPs) 100 (a/k/a "multimedia device"), a frame buffer compressor 200, a memory 300, and a system bus 400.

The multimedia IPs 100 may be a part which performs image processing of the image processing device firsthand. In other words, the multimedia IPs 100 may be several modules for recording and playing a video, such as for performing camcording and playback.

The multimedia IPs 100 may receive raw data from an external source, such as a camera, and convert the received raw data into source data 10. The raw data may be video or image raw data. The source data 10 is generated by the multimedia IPs 100 and may include data which is being processed by the multimedia IPs 100. In other words, multimedia IPs 100 may repeatedly store data obtained by processing the raw data in the memory 300 and update the stored data through several operations. The source data 10 may include all data in such an operation. However, the source data 10 may be stored in the memory 300 in the form of compressed data 20. Therefore, the source data 10 may indicate data before it is stored in the memory 300 or data read from the memory 300. This will be described in further detail below.

Specifically, the multimedia IPs 100 may include an image signal processor (ISP) 110, a shake correction module (G2D) 120, a multi-format codec (MFC) 130, a graphics processing unit (GPU) 140, and a display 150. However, exemplary embodiments of the present disclosure are not limited thereto. In other words, the multimedia IPs 100 may include only some of the aforementioned ISP 110, G2D 120, MFC 130, GPU 140, and display 150. In other words, the multimedia IPs 100 may indicate processing modules which are required to access the memory 300 so as to process a video or image.

The ISP 110 may receive and convert the raw data into the source data by preprocessing the raw data. The raw data may be image raw data of a red-green-blue (RGB) format. For example, the ISP 110 may convert RGB raw data into the source data 10 of a YUV format.

The RGB format indicates a data format in which colors are represented on the basis of the three primary colors of light. In other words, three colors of red, green, and blue are used to show an image. On the other hand, the YUV format indicates a data format in which a brightness, that is, luminance (luma), signal and a chrominance (chroma) signal are separately represented. In other words, Y indicates a luma signal, and U(Cb) and V(Cr) each indicate chroma signals. U indicates a difference between luma signal and blue signal components, and V indicates a difference between luma signal and red signal components.

Such YUV data may be acquired by converting RGB data with conversion equations, for example, $T=0.3R+0.59G+0.11B$, $U=(B-Y)\times 0.493$, and $V=(R-Y)\times 0.877$.

Human eyes are sensitive to luma signals and are less sensitive to color signals. Therefore, YUV data may be easily compressed compared to RGB data. Accordingly, the ISP 110 may convert the RGB raw data into the YUV source data 10.

After converting the raw data into the source data 10, the ISP 110 may store the source data 10 in the memory 300.

The G2D 120 may perform shake correction on the image or video data. The G2D 120 may read the raw data or the source data 10 stored in the memory 300 and perform shake correction. Shake correction indicates a process of detecting a shake of a camera in video data and removing the shake from the video data.

The G2D 120 may generate or update new source data 10 by correcting a shake of the raw data or the source data 10 and store the new source data 10 in the memory 300.

The MFC 130 may be a codec for compressing video data. In general, video data has a very large size and thus requires a compression module for reducing the size thereof. Video data may be compressed on the basis of correlations between a plurality of frames, and this may be performed by the MFC 130. The MFC 130 may read the raw data or the source data 10 stored in the memory 300 and may compress the read data.

The MFC 130 may generate the new source data 10 or update the source data 10 by compressing the raw data or the source data 10 and store the new source data 10 or the updated source data 10 in the memory 300.

The GPU 140 may calculate and generate two-dimensional (2D) or three-dimensional (3D) graphics. The GPU 140 may calculate the raw data or the source data 10 stored in the memory 300. The GPU 140 is specialized in processing graphic data and thus may process graphic data in parallel.

Like the MFC 130, the GPU 140 may generate the new source data 10 or update the source data 10 by compressing the raw data or the source data 10 and store the new source data 10 or the updated source data 10 in the memory 300.

The display 150 may display the source data 10 stored in the memory 300 on a screen. The display 150 may display image data, that is, source data 10, processed by other multimedia IPs 100, that is, the ISP 110, the G2D 120, the MFC 130, and the GPU 140, on the screen. However, an exemplary embodiment of the present disclosure is not limited thereto.

The ISP 110, the G2D 120, the MFC 130, the GPU 140, and the display 150 of the multimedia IPs 100 may operate individually and independently. In other words, the ISP 110, the G2D 120, the MFC 130, the GPU 140, and the display 150 may individually access the memory 300 and transmit write data or receive read data.

The frame buffer compressor 200 converts the source data 10 into compressed data 20 by compressing the source data 10 before the multimedia IPs 100 individually access the memory 300. The frame buffer compressor 200 may transmit the compressed data 20 to the memory 300.

Accordingly, the compressed data 20 compressed by the frame buffer compressor 200 may be stored in the memory 300. On the other hand, when the compressed data 20 stored in the memory 300 is loaded by the multimedia IPs 100, the compressed data 20 may be transmitted to the frame buffer compressor 200. The frame buffer compressor 200 may convert the compressed data 20 into output data 30 by decompressing the compressed data 20. The frame buffer compressor 200 may transmit the output data 30 to the multimedia IPs 100. The output data 30 is fundamentally identical to the source data 10 but may vary in the compression and decompression processes.

Every time the ISP 110, the G2D 120, the MFC 130, the GPU 140, and the display 150 of the multimedia IPs 100 individually access the memory 300, the frame buffer compressor 200 may compress the source data 10 into the compressed data 20 and transfer the compressed data 20 to the memory 300. On the other hand, every time the ISP 110, the G2D 120, the MFC 130, the GPU 140, and the display 150 of the multimedia IPs 100 request data from the memory 300, the frame buffer compressor 200 may decompress the compressed data 20 into the output data 30 and transmit the output data 30 to the ISP 110, the G2D 120, the MFC 130, the GPU 140, and the display 150 of the multimedia IPs 100 each.

The memory 300 may store the compressed data 20 generated by the frame buffer compressor 200 and provide the stored compressed data 20 to the frame buffer compressor 200 so that the frame buffer compressor 200 may decompress the compressed data 20.

The system bus 400 may connect the frame buffer compressor 200 and the memory 300. Specifically, the ISP 110, the G2D 120, the MFC 130, the GPU 140, and the display 150 of the multimedia IPs 100 may be individually connected to the system bus 400 through the frame buffer compressor 200.

The frame buffer compressor 200 may include an encoder 210 and a decoder 220.

The encoder 210 may receive the source data 10 from the multimedia IPs 100 and generate the compressed data 20. The source data 10 may be transmitted from the ISP 110, the G2D 120, the MFC 130, the GPU 140, and the display 150 of the multimedia IPs 100 each. The compressed data 20 may be transmitted to the memory 300 through the multimedia IPs 100 and the system bus 400.

On the contrary, the decoder 220 may decompress the compressed data 20 stored in the memory 300 into the output data 30. The output data 30 may be transferred to the multimedia IPs 100. In this case, the output data 30 may be transferred to the ISP 110, the G2D 120, the MFC 130, the GPU 140, and the display 150 of the multimedia IPs 100 each.

Figure 3:
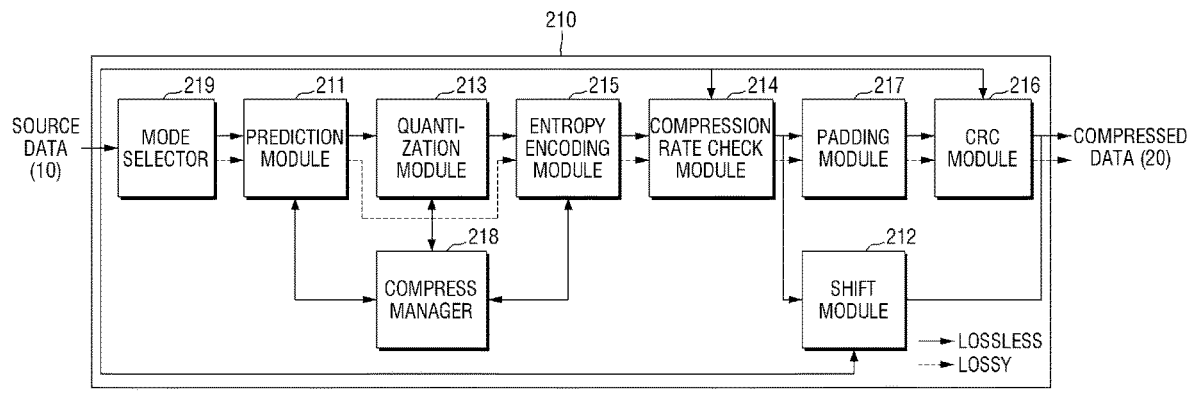
FIG. 3 is a block diagram illustrating an encoder of FIG. 2 in detail.

FIG. 3 is a block diagram illustrating the encoder of FIG. 2 in detail. Referring to FIG. 3, the encoder 210 includes a first mode selector 219, a prediction module 211, a quantization module 213, an entropy encoding module 215, a compress manager 218, a compression rate check module 214, a padding module 217, a shift module 212, and a cyclic redundancy check (CRC) module 216.

The first mode selector 219 may determine whether the encoder 210 operates in a lossless mode or a lossy mode. When the encoder 210 operates in the lossless mode according to the first mode selector 219, the source data 10 may be compressed along a lossless path LOSSLESS of FIG. 3. When the encoder 210 operates in the lossy mode, the source data 10 may be compressed along a lossy path LOSSY.

The first mode selector 219 may receive a signal for determining whether to perform lossless compression or lossy compression from the multimedia IPs 100. Lossless compression indicates data compression without data loss, in which a compression rate varies according to data. On the other hand, lossy compression indicates data compression with some data loss. Lossy compression may have a higher compression rate than lossless compression and have a preset fixed compression rate.

In the lossless mode, the first mode selector 219 may lead the source data 10 to the prediction module 211, the entropy encoding module 215, the compression rate check module 214, the padding module 217, and the CRC module 216 along the lossless path LOSSLESS. On the other hand, in the lossy mode, the first mode selector 219 may lead the source data 10 to the prediction module 211, the quantization module 213, the entropy encoding module 215, the compression rate check module 214, the padding module 217, the shift module 212, and the CRC module 216 along the lossy path LOSSY.

The prediction module 211 may divide the source data 10 into prediction data and residual data and represent the prediction data and the residual data as the source data 10. For example, when one pixel has a value of 0 to 255, each pixel may require 8-bit data to represent the value. In this connection, when adjacent pixels have similar values, only a difference between adjacent pixels, that is, a residual, may be represented. Even in this case, there is no data loss, and the number of data bits for an indication may be remarkably reduced. For example, pixels having values of (253, 254, 255) may be consecutive. In this case, when prediction data is set to 253, a residual data indication of (253 (reference), 1 (residual), 2 (residual)) may be sufficient, and the number of bits per pixel for such a residual data indication may be remarkably reduced to 2.

Therefore, the prediction module 211 may compress the size of the source data 10 by converting the source data 10 into prediction data including reference data and residual data. Needless to say, various methods may be used to set the reference data.

The prediction module 211 may make a prediction per pixel or block. Here, a block may indicate a region composed of a plurality of adjacent pixels.

The quantization module 213 may additionally compress the source data 10 compressed by the prediction module 211. The quantization module 213 may remove least significant bits of the source data 10 using a preset quantization parameter (QP). Specifically, the quantization module 213 selects a representative value by multiplying data and the QP together, but loss may be caused by rounding off after the decimal point. When the value of a pixel data is 0 to $2^8-1(=255)$, the QP may be defined to be $1/(2^n-1)$ (where n is an integer of 8 or less). However, exemplary embodiments of the present disclosure are not limited thereto.

The removed least significant bits may not be restored later and thus may be lost. Therefore, the quantization module 213 may be used only in the lossy mode. However, the lossy mode may have a higher compression rate than the lossless mode and may have a preset fixed compression rate. Therefore, information on a compression rate may not be required later.

The entropy encoding module 215 may compress the source data 10 which has been compressed by the quantization module 213 in the lossy mode or the source data 10 which has been compressed by the prediction module 211 in the lossless mode through entropy coding. The entropy coding may employ a method of allocating the number of bits according to a frequency.

The entropy encoding module 215 may compress the source data 10 through Huffman coding. Alternatively, the entropy encoding module 215 may compress the source data 10 through exponential Golomb coding or Golomb-Rice coding. Since the entropy encoding module 215 may generate a table using a k value, it is possible to simply compress the source data 10.

The compress manager 218 determines a combination of a quantization parameter (QP) table and an entropy table, which are respectively used for quantization and entropy coding, and controls compression of the source data 10 according to the determined combination of a QP table and an entropy table.

In this case, the first mode selector 219 determines that the encoder 210 operates in the lossy mode, and accordingly the source data 10 is compressed along the lossy path LOSSY of FIG. 3. In other words, the compress manager 218 determines a combination of a QP table and an entropy table and compresses the source data 10 according to the determined combination of a QP table and an entropy table only when the frame buffer compressor 200 compresses the source data 10 using a lossy compression algorithm.

Specifically, the QP table may include one or more entries, and each entry may include a QP which is used to quantize the source data 10. Since the concepts of a QP table and a QP are already known as an image compression technique, detailed description thereof will be omitted herein.

Meanwhile, an entropy table indicates a table of a plurality of codes which are identified with k values to perform an entropy coding algorithm. An entropy table which may be used in some exemplary embodiments of the present disclosure may include at least one of an exponential Golomb code and a Golomb-Rice code. Since the concepts of entropy coding, the exponential Golomb coding algorithm, and the Golomb-Rice coding algorithm are already known as a data compression technique, detailed description thereof will be omitted herein.

The compress manager 218 determines a QP table including a predetermined number of entries, and the frame buffer compressor 200 quantizes the image data 10 for which predictions have been completed using the determined QP table. Also, the compress manager 218 determines an entropy table using a predetermined number of k values, and the frame buffer compressor 200 performs entropy coding on the source data 10 for which quantization has been completed using the determined entropy table. In other words, the frame buffer compressor 200 generates the compressed data 20 on the basis of the combination of the QP table and the entropy table determined by the compress manager 218.

The compression rate check module 214 may check the compression rate of the source data 10 which has passed up to the entropy encoding module 215. The compression rate check module 214 may generate a header index according to a compression rate in the lossless mode. The header index indicates the compression rate of the compressed data 20 and may be stored in a header. This will be described in further detail below.

When the source data 10 has been compressed at a specific compression rate or less in the lossless mode (when the header index is 0), the compression rate check module 214 may transfer the source data 10 which has not been compressed by the foregoing modules to the padding module 217 as it is. This is because it may be better not to compress the source data 10 when the compression rate of the source data 10 is the specific compression rate or less. In this case, the padding module 217 also may not pad the source data 10. In this case, the CRC module 216 also may not add a CRC bit to the source data 10. This will be described in further detail below.

When the compression rate of the source data 10 is smaller than a predetermined compression rate in the lossy mode, the compression rate check module 214 may lead the source data 10 to the shift module 212. Since a QP of the quantization module 213 is restrictively selected, the predetermined compression rate may not be achieved in the lossy mode. In this case, the compression rate check module 214 may transmit the source data 10 to the shift module 212 so as to achieve the predetermined compression rate.

The padding module 217 may pad the source data 10 compressed by the entropy encoding module 215 in the lossless mode. Padding may indicate an operation of adding meaningless data so as to increase a data size to a specific size. This will be described in further detail below.

The padding module 217 may be activated in the lossy mode as well as the lossless mode. In the lossy mode, when the source data 10 is compressed by the quantization module 213, the source data 10 may be compressed at a rate higher than an intended compression rate. In this case, even in the lossy mode, the source data 10 may be converted into the compressed data 20 through the padding module 217 and transmitted to the memory 300.

The CRC module 216 may receive the source data 10, which has not been compressed by the foregoing modules, firsthand. The CRC module 216 may perform a CRC calculation with a pre-stored polynomial and thereby generate CRC bits. Subsequently, the CRC bits are attached to the compressed data 20 and then may be used as a means for determining whether there is an error in compression and decompression processes when the compressed data 20 is decompressed into the output data 30. This will be described in further detail below.

When the compression rate check module 214 determines that the compression rate of the source data 10 is smaller than the predetermined compression rate of the lossy mode, the shift module 212 may forcedly compress the source data 10. The shift module 212 may receive the source data 10 which has not been compressed by the foregoing modules and forcedly compress the source data 10 at the predetermined compression rate through a bit-shift calculation. In this case, the compressed data 20 may be generated by the shift module 212 without the padding module 217 or the CRC module 216.

Subsequently, the frame buffer compressor 200 may write the generated compressed data 20 in the memory 300. Also, the frame buffer compressor 200 may read the compressed data 20 from the memory 300, decompress the read compressed data 20, and provide the output data 30 to the multimedia IPs 100.

Figure 4:
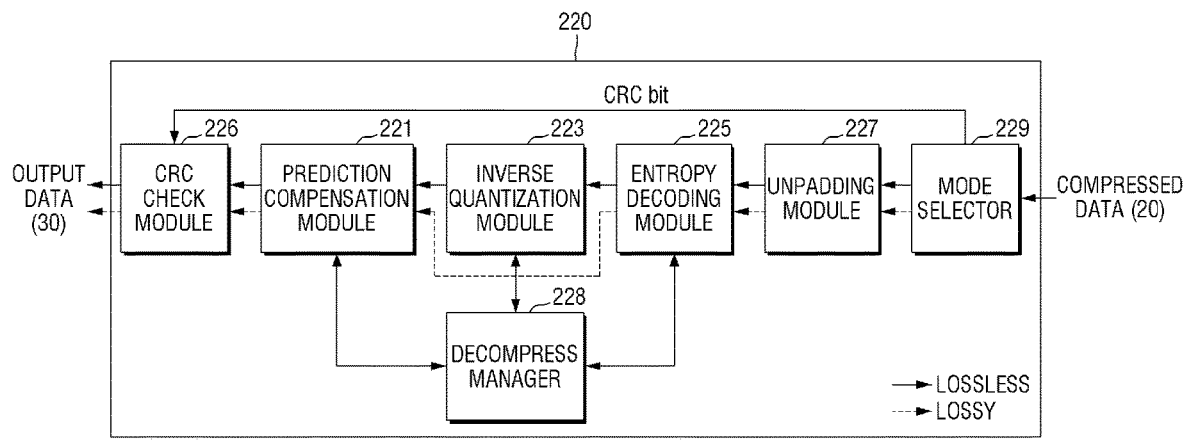
FIG. 4 is a block diagram illustrating a decoder of FIG. 2 in detail.

FIG. 4 is a block diagram illustrating the decoder of FIG. 2 in detail. Referring to FIGS. 3 and 4, the decoder 220 includes a second mode selector 229, an unpadding module 227, an entropy decoding module 225, an inverse quantization module 223, a decompress manager 228, a prediction compensation module 221, and a CRC check module 226.

The second mode selector 229 may determine whether the compressed data 20 stored in the memory 300 has been compressed with or without loss. The second mode selector 229 may determine whether the compressed data 20 has been compressed in the lossless mode or the lossy mode on the basis of whether there is a header. This will be described in further detail below.

The second mode selector 229 may separate CRC bits from the compressed data 20 and transmit the separated CRC bits to the CRC check module 226. In the lossless mode, the second mode selector 229 may lead the compressed data 20 to the unpadding module 227, the entropy decoding module 225, the prediction compensation module 221, and the CRC check module 226 along a lossless path LOSSLESS. On the other hand, in the lossy mode, the second mode selector 229 may lead the compressed data 20 to the unpadding module 227, the entropy decoding module 225, the inverse quantization module 223, and the prediction compensation module 221 along a lossy path LOSSY.

The unpadding module 227 may remove a padded part of data which has been padded by the padding module 217 of the encoder 210. The entropy decoding module 225 may decompress the data compressed by the entropy encoding module 215. The entropy decoding module 225 may perform decompression through Huffman coding, exponential Golomb coding, or Golomb-Rice coding. Since the compressed data 20 includes a k value, the entropy decoding module 225 may perform decoding using the k value.

The inverse quantization module 223 may decompress the data compressed by the quantization module 213. The inverse quantization module 223 may restore the compressed data 20, which has been compressed by the quantization module 213 using the determined QP, but is not able to completely restore up to a part which has been lost during the compression process. Therefore, the inverse quantization module 223 may be used only in the lossy mode.

The inverse quantization module 223 may decompress the compressed data 20 which has been shifted by the shift module 212 by shifting the compressed data 20 in the opposite direction.

The prediction compensation module 221 may restore the prediction data in which the reference data and the residual data are included by the prediction module 211. For example, the prediction compensation module 221 may convert a residual data indication of (253 (reference), 1 (residual), 2 (residual)) into (253, 254, 255).

The prediction compensation module 221 may restore predictions which have been made per pixel or block by the prediction module 211. Accordingly, the compressed data 20 may be restored or decompressed into the output data 30 and transmitted to the multimedia IPs 100.

The decompress manager 228 may perform an operation in which the combination of the QP table and the entropy table, which have been determined to compress the source data 10 by the compress manager 218 described above with reference to FIG. 3, may be appropriately applied to decompression of the compressed data 20.

The CRC check module 226 may receive CRC bits from the second mode selector 229. The CRC check module 226 may generate comparative CRC bits by performing a CRC calculation with a polynomial, which has been pre-stored for the output data 30 decompressed by the foregoing modules. The polynomial may be identical to a polynomial stored in the CRC module 216 of FIG. 3.

The CRC check module 226 may compare the CRC bits and the comparative CRC bits with each other. When the CRC bits are identical to the comparative CRC bits, the output data 30 may be completely identical to the source data 10. In this case, it is possible to see that there has been not any error in the compression and decompression processes.

On the contrary, when the CRC bits differ from the comparative CRC bits, the output data 30 may differ from the source data 10. In this case, it is possible to see that an error has occurred in the compression and decompression processes. In this case, the CRC check module 226 may make an error mark on the output data 30. The error mark may notify a user that an error has occurred in the compression or decompression process. For example, the CRC check module 226 may allocate a specific color to the output data 30 so that a user may recognize a part of the specific color as a part in which an error has occurred.

Source data of the image processing device according to some exemplary embodiments of the present disclosure may be YUV data. YUV data may have a YUV 420 format and a YUV 422 format.

Figure 5:
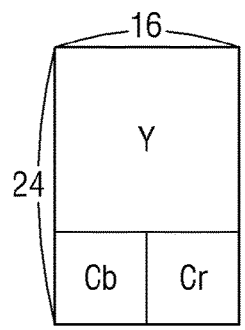
FIG. 5 is a conceptual diagram illustrating three operating modes of the image processing device according to some exemplary embodiments of the present disclosure for YUV 420 data.
Figure 5:
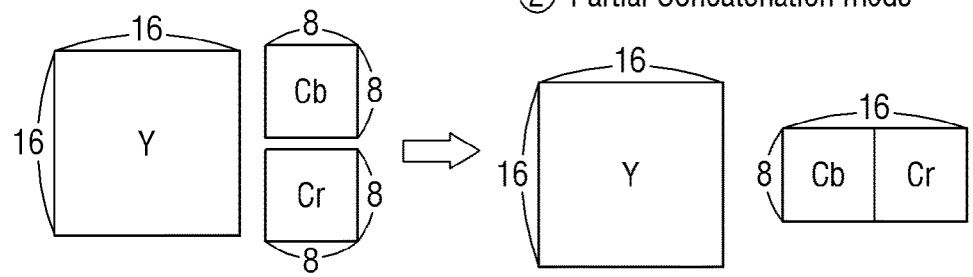
Figure 5:
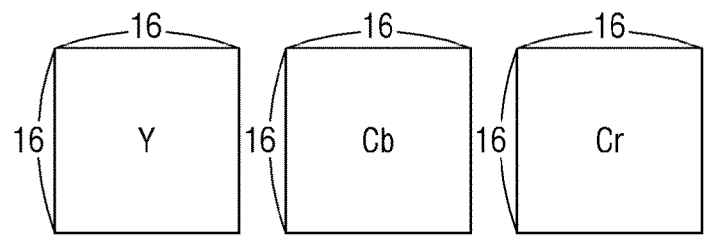

FIG. 5 is a conceptual diagram illustrating three operating modes of the image processing device according to some exemplary embodiments of the present disclosure for YUV 420 data.

Referring to FIGS. 1 to 5, the encoder 210 and the decoder 220 of the frame buffer compressor 200 may have three operating modes. The source data 10 of the YUV 420 format may have a 16×16 luma signal block Y, an 8×8 first chroma signal block Cb or U, and an 8×8 second chroma signal block Cr or V. The size of each block indicates how many rows and columns pixels included in the block are arranged in, and the size of 16×16 indicates that a block is composed of a plurality of pixels constituting 16 rows and 16 columns.

The frame buffer compressor 200 may include three operating modes of a concatenation mode 1, a partial concatenation mode 2, and a separation mode 3. The three modes relate to data compression formats and may be operating modes determined independently of the lossy mode and the lossless mode.

First, in the concatenation mode 1, the luma signal block Y, the first chroma signal block Cb, and the second chroma signal block Cr are compressed and decompressed all together. In other words, in the concatenation mode 1, a unit block for compression may be a block in which the luma signal block Y, the first chroma signal block Cb, and the second chroma signal block Cr are combined as shown in FIG. 5. Accordingly, the unit block for compression may have a size of 16×24.

In the partial concatenation mode 2, the luma signal block Y may be separately compressed and decompressed, but the first chroma signal block Cb and the second chroma signal block Cr may be combined with each other and compressed and decompressed together. Accordingly, the luma signal block Y may have the original size of 16×16, and the combined block of the first chroma signal block Cb and the second chroma signal block Cr may have a size of 16×8.

In the separation mode 3, all of the luma signal block Y, the first chroma signal block Cb, and the second chroma signal block Cr are separately compressed and decompressed. To make the sizes of unit blocks for compression and decompression identical to each other, the luma signal block Y may be maintained with the original size of 16×16, and the first chroma signal block Cb and the second chroma signal block Cr may be enlarged to 16×16. Accordingly, when the number of luma signal blocks Y is N, the number of first chroma signal blocks Cb and the number of second chroma signal blocks Cr may be reduced to N/4 each.

When the frame buffer compressor 200 of the image processing device according to some exemplary embodiments of the present disclosure operates in the concatenation mode 1, it is possible to read all necessary data by requesting access to the memory 300 only once. In particular, when the multimedia IPs 100 require RGB data rather than YUV data, it is advantageous to operate in the concatenation mode 1. This is because it is possible to acquire the luma signal block Y, the first chroma signal block Cb, and the second chroma signal block Cr all together and all of the luma signal block Y, the first chroma signal block Cb, and the second chroma signal block Cr are required to acquire RGB data.

On the other hand, in the separation mode 3, when a unit block for compression is smaller than that of the concatenation mode 1, less hardware resources may be required. Therefore, when the multimedia IPs 100 require YUV data rather than RGB data, the separation mode 3 may be advantageous.

Finally, the concatenation mode 1 and the separation mode 3 are mixed in the partial concatenation mode 2. The partial concatenation mode 2 requires less hardware resources than the concatenation mode 1. Even when RGB data is necessary, the number (two) of requests for access to the memory 300 may be smaller than that in the separation model 3.

The first mode selector 219 may determine in which one of the three modes, that is, the concatenation mode 1, the partial concatenation mode 2, and the separation mode 3, the source data 10 will be compressed. The first mode selector 219 may receive a signal indicating in which one of modes among the concatenation mode 1, the partial concatenation mode 2, and the separation mode 3 the image processing device will operate from the multimedia IPs 100.

The second mode selector 229 may decompress the compressed data 20 according to in which one of the concatenation mode 1, the partial concatenation mode 2, and the separation mode 3 the source data 10 has been compressed.

Figure 6:
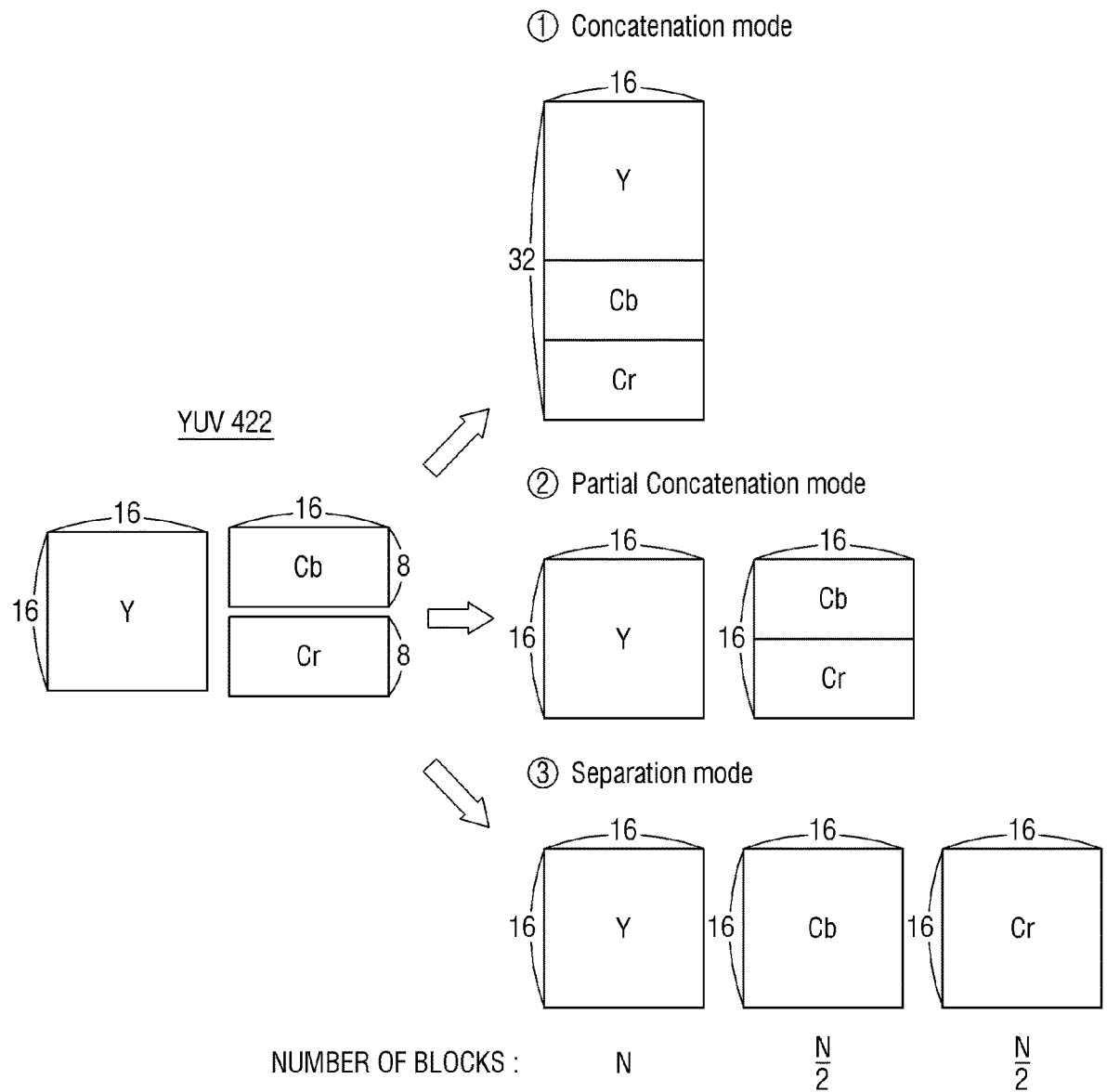
FIG. 6 is a conceptual diagram illustrating three operating modes of the image processing device according to some exemplary embodiments of the present disclosure for YUV 422 data.

FIG. 6 is a conceptual diagram illustrating three operating modes of the image processing device according to some exemplary embodiments of the present disclosure for YUV 422 data.

Referring to FIGS. 1 to 4 and FIG. 6, the encoder 210 and the decoder 220 of the frame buffer compressor 200 may also have three operating modes for the YUV 422 format. The source data 10 of the YUV 422 format may have a 16×16 luma signal block Y, a 16×8 first chroma signal block Cb or U, and a 16×8 second chroma signal block Cr or V.

In a concatenation mode 1, a unit block for compression may be obtained by combining the luma signal block Y, the first chroma signal block Cb, and the second chroma signal block Cr. Accordingly, the unit block for compression may have a size of 16×32.

In a partial concatenation mode 2, the luma signal block Y may be separately compressed and decompressed, but the first chroma signal block Cb and the second chroma signal block Cr may be combined with each other and compressed and decompressed together. Accordingly, the luma signal block Y may have the original size of 16×16, and the combined block of the first chroma signal block Cb and the second chroma signal block Cr may have a size of 16×16. Therefore, the luma signal block Y and the combined block of the first chroma signal block Cb and the second chroma signal block Cr may be the same size.

In the separation mode 3, all of the luma signal block Y, the first chroma signal block Cb, and the second chroma signal block Cr are separately compressed and decompressed. To make the sizes of unit blocks for compression and decompression identical to each other, the luma signal block Y may be maintained with the original size of 16×16, and the first chroma signal block Cb and the second chroma signal block Cr may be enlarged to 16×16.

Accordingly, when the number of luma signal blocks Y is N, the number of first chroma signal blocks Cb and the number of second chroma signal blocks Cr may be reduced to N/2 each.

Figures 7, 8:
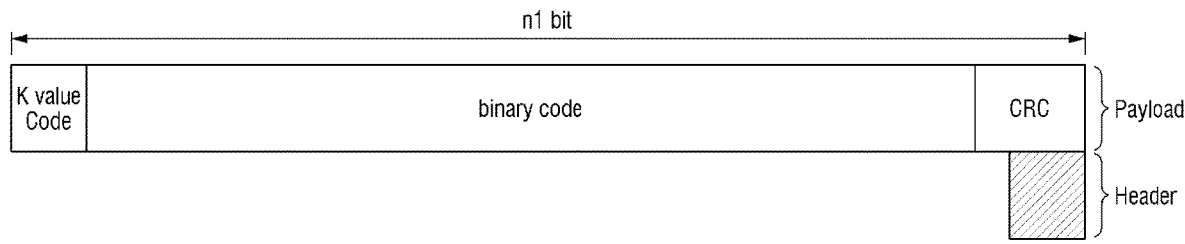
FIG. 7 is a diagram illustrating a structure of data compressed without loss by the image processing device according to some exemplary embodiments of the present disclosure.
FIG. 8 is a table illustrating a compression method of the lossless compressed data of FIG. 7.

FIG. 7 is a diagram illustrating a structure of data compressed without loss by the image processing device according to some exemplary embodiments of the present disclosure, and FIG. 8 is a table illustrating a compression method of the lossless compressed data of FIG. 7.

Referring to FIGS. 1 to 8, the compressed data 20 may include a payload and a header. The header is a part for indicating a compression rate, and the payload is a part for indicating compressed actual data and values required for decompression.

FIG. 8 is a table illustrating lossless compression of a block having a size of 16×16 by way of example. Since the format of data is YUV 420 and an operating mode is the separation mode 3, a luma signal block Y, a first chroma signal block Cb, or a second chroma signal block Cr of the FIG. 5 may correspond to the table. A pixel depth indicates a bit value of a value represented in one pixel. For example, a pixel depth is 8 bits to represent a value of 0 to 255. Therefore, in the example of FIG. 8, a value represented in each pixel may be 0 to 255.

The data size of the memory 300 that can be accessed at once in a hardware manner has been determined. This may be defined as a burst length. In other words, the burst length of the memory 300 may indicate the data size of the memory 300 that can be accessed at once. For convenience of description, FIG. 8 will be described on the assumption that the burst length of the memory 300 is 32 bytes.

One pixel has data of 8 bites, that is, 1 byte, and a 16×16 block may have data having a total of 256 bytes. In other words, the size of the source data 10 may be 256 bytes.

In the case of lossless compression, the size of the compressed data 20 may vary every compression, and it is necessary to separately record the size of the compressed data 20 so as to read the compressed data 20 from the memory 300. However, when the size of the compressed data 20 is recorded as it is, compression efficiency may be reduced due to the size of the record. Therefore, compression efficiency may be increased by standardizing compression rates.

Specifically, FIG. 8 shows standards of compression rates which are defined when the data burst length of the memory 300 is 32 bytes. In other words, when the size of the compressed data 20 is 0 bytes to 32 bytes, the compression rate is 100% to 87.5%. Therefore, an operation of adjusting the compression rate to 87.5% (i.e., an operation of adjusting the size of the compressed data 20 to 32 bytes) may be performed, and 1 may be recorded in the header. Likewise, when the size of the compressed data 20 is 161 bytes to 192 bytes, the compression rate is 37.5% to 25%. Therefore, an operation of adjusting the compression rate to 25% (i.e., an operation of adjusting the size of the compressed data 20 to 192 bytes) may be performed, and 6 may be recorded in the header. However, when the compression rate is 0% to 12.5%, 0 may be recorded in the header.

As mentioned above, when 0 is recorded in the header, the compression rate check module 214 of FIG. 3 may store the source data 10 which is not compressed in the memory 300 as the compressed data 20. This is because compression is useless when the operation of adjusting the compression rate to 0% is performed due to the compression rate of 0% to 12.5%. In this case, the source data 10 may become the compressed data 20 as it is by the compression rate check module 214.

The padding module 217 of FIG. 3 may perform an operation of adjusting the size of the compressed data 20 to the maximum size of the corresponding standard as mentioned above. In other words, when the size of the compressed data 20 is 170 bytes, the size is between 161 bytes and 192 bytes. Therefore, the size of the compressed data 20 may be adjusted to 192 bytes by performing a padding operation of adding "0"s corresponding to 22 bytes. When the header index is 0, the padding module 217 of FIG. 3 does not perform a padding operation as mentioned above.

The compressed data 20 whose size has been adjusted to the standards by the padding module 217 may become the payload of the compressed data 20. Accordingly, the size (n1 bits) of the payload may be n (n is an integer) times the size of a data access unit, that is, the burst length, of the memory 300.

The header may be a part for indicating the header index of FIG. 8. The header size may vary according to the size of the compressed data 20. In the case of FIG. 8, however, it is necessary to indicate only 0 to 7, and thus the header size may be 3 bits.

The header and the payload may be stored in different areas of the memory 300. In other words, the header may be stored to be adjacent to another header, and the payload may be stored to be adjacent to another payload.

The payload may include a binary code, a k value code, and CRC bits. The binary code may be a part obtained by compressing the source data 10. The k value code may indicate a k value determined by the entropy encoding module 215. The CRC bits may be attached by the CRC module 216 of FIG. 3. The CRC bits may be attached instead of a meaningless padding part of the payload. The CRC bits may be positioned at the end of the payload.

As described above, when the header index is 0, the source data 10 becomes the compressed data as it is. Therefore, no CRC bits may be required. This will be described in further detail below.

Since a current mode is the separation mode 3, the k value code may be a k value for any one of the luma signal block Y, the first chroma signal block Cb, and the second chroma signal block Cr.

FIG. 9 is a diagram illustrating a structure of data compressed without loss by the image processing device according to some exemplary embodiments of the present disclosure, and FIG. 10 is a table illustrating a compression method of the lossless compressed data of FIG. 9.

FIG. 10 is a table illustrating lossless compression of a block having a size of 16×8 by way of example. Since the format of data is YUV 420 and an operating mode is the partial concatenation mode 2, the combined block of the first chroma signal block Cb and the second chroma signal block Cr may correspond to the table. For convenience of description, FIG. 10 also will be described on the assumption that the burst length of the memory 300 is 32 bytes.

A 16×8 block may have data having a total of 128 bytes. In other words, the size of the source data 10 may be 128 bytes.

Standards of compression rates are defined according to 32 bytes which is the data burst length of the memory 300. In other words, when the size of the compressed data 20 is 0 bytes to 32 bytes, the compression rate is 100% to 75%. Therefore, an operation of adjusting the compression rate to 75% (i.e., an operation of adjusting the size of the compressed data 20 to 32 bytes) may be performed, and 1 may be recorded in the header. Likewise, when the size of the compressed data 20 is 65 bytes to 96 bytes, the compression rate is 50% to 25%. Therefore, an operation of adjusting the compression rate to 25% (i.e., an operation of adjusting the size of the compressed data 20 to 96 bytes) may be performed, and 3 may be recorded in the header. This may be performed by the padding module 217 of FIG. 3.

Referring to FIG. 9, the compressed data 20 whose size has been adjusted to the standards by the padding module 217 may become the payload of the compressed data 20. Accordingly, the size (n2 bits) of the payload may be n (n is an integer) times the data burst length of the memory 300.

The payload may include a binary code, a k value code, and CRC bits. Since a current mode is the partial concatenation mode 2 and the corresponding block is a combined block of a 16×8 first chroma signal block Cb and a 16×8 second chroma signal block Cr, the k value code may include a k value code (Cb) of the first chroma signal block Cb and a k value code (Cr) of the second chroma signal block Cr. The k value code (Cb) of the first chroma signal block Cb and the k value code (Cr) of the second chroma signal block Cr may be arranged in any sequence.

FIG. 11 is a diagram illustrating a structure of data compressed without loss by the image processing device according to some exemplary embodiments of the present disclosure.

Referring to FIG. 11, when a current mode is the concatenation mode 1, a combined block of a luma signal block Y, a first chroma signal block Cb, and a second chroma signal block Cr is compressed, and thus a k value code may include a k value code (Y) of the luma signal block Y, a k value code (Cb) of the first chroma signal block Cb, and a k value code (Cr) of the second chroma signal block Cr. The k value code (Y) of the luma signal block Y, the k value code (Cb) of the first chroma signal block Cb, and the k value code (Cr) of the second chroma signal block Cr may be arranged in any sequence.

The size (n3 bits) of the payload including a binary code, the k value code, and CRC bits may be n (n is an integer) times the size of the data burst length of the memory 300.

Figure 12:
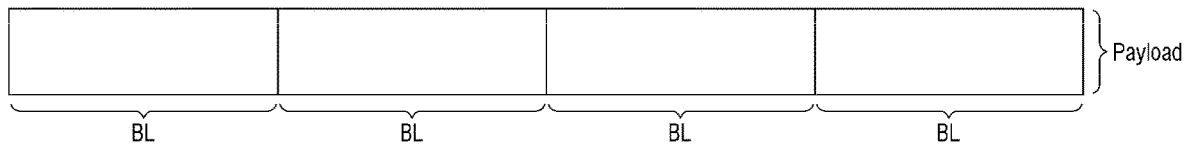
FIG. 12 is a diagram illustrating a payload structure of data compressed without loss by the image processing device according to some exemplary embodiments of the present disclosure when the header index is 0.
Figure 13:
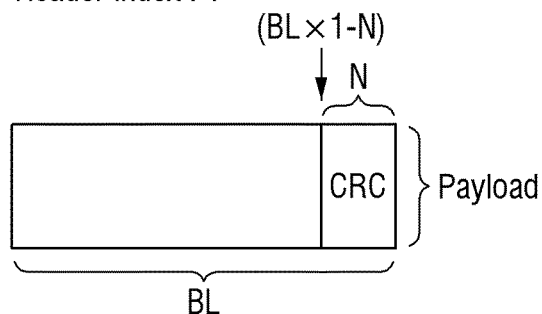
FIG. 13 is a diagram illustrating a payload structure of data compressed without loss by the image processing device according to some exemplary embodiments of the present disclosure when the header index is 1.
Figure 14:
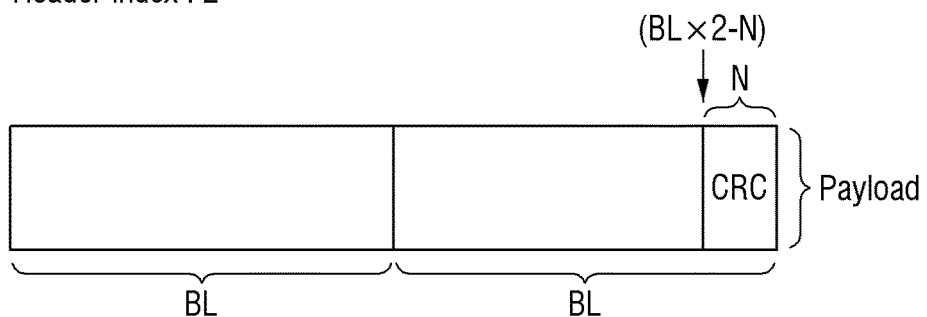
FIG. 14 is a diagram illustrating a payload structure of data compressed without loss by the image processing device according to some exemplary embodiments of the present disclosure when the header index is 2.

FIG. 12 is a diagram illustrating a payload structure of data compressed without loss by the image processing device according to some exemplary embodiments of the present disclosure when the header index is 0, and FIG. 13 is a diagram illustrating a payload structure of data compressed without loss by the image processing device according to some exemplary embodiments of the present disclosure when the header index is 1. FIG. 14 is a diagram illustrating a payload structure of data compressed without loss by the image processing device according to some exemplary embodiments of the present disclosure when the header index is 2, and FIG. 15 is a diagram illustrating a payload structure of data compressed without loss by the image processing device according to some exemplary embodiments of the present disclosure when the header index is 3.

Referring to FIG. 12, the source data 10 may be four times a burst length BL. In this case, when the header index is 0, the payload may not include a CRC bit.

This is because, when the header index is 0, the source data 10 has not been compressed at all, and thus it is unnecessary to generate CRC bits through a CRC calculation and append the generated CRC bits. Therefore, when the header index is 0 in lossless compression, no CRC bits may be included in the payload. However, a k value may be included in the payload.

Figure 15:
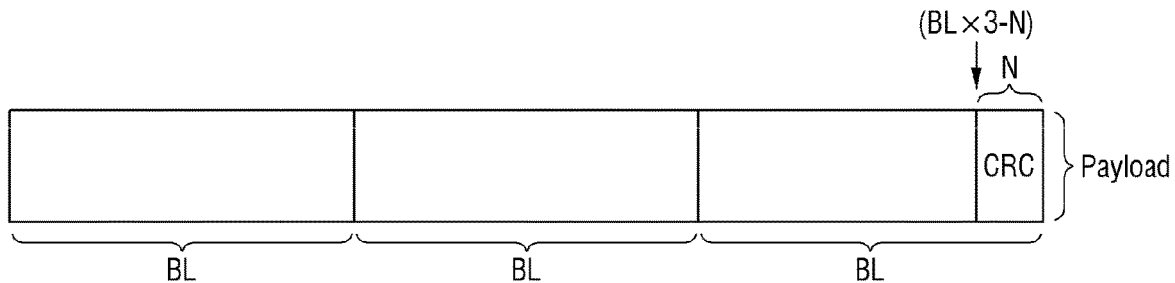
FIG. 15 is a diagram illustrating a payload structure of data compressed without loss by the image processing device according to some exemplary embodiments of the present disclosure when the header index is 3.

Referring to FIGS. 13 to 15, when the header index is not 0, CRC bits may be included at the end of the payload.

In this case, the position of CRC bits may be BL×h−N. Here, BL is a burst length, and N may be the size of CRC bits. h indicates a header index. In other words, when the header index is 1, BL−N may be the starting position of CRC bits.

The CRC module 216 of FIG. 3 may append CRC bits to an appropriate position using the header index, the burst length, and the size of CRC bits. In the case of lossless compression, the compressed data 20 continuously varies in size, and thus such a calculation may be necessary.

Figure 16:
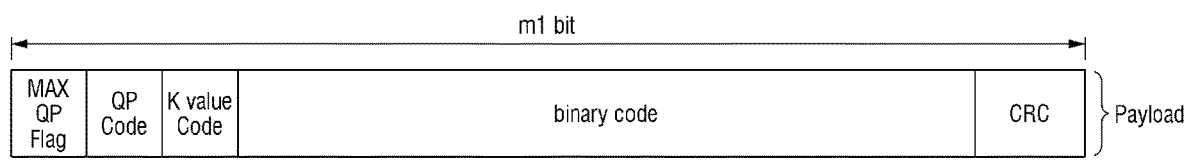
FIG. 16 is a diagram illustrating a structure of data compressed with loss by the image processing device according to some exemplary embodiments of the present disclosure.

FIG. 16 is a diagram illustrating a structure of data compressed with loss by the image processing device according to some exemplary embodiments of the present disclosure. Referring to FIG. 16, the compressed data 20 compressed in the lossy mode may include only a payload without a header.

The payload may include a maximum QP flag, a binary code, a k value code, a QP code, and CRC bits.

The maximum QP flag may be a 1-bit indication of whether the source data 10 has been transmitted from the compression rate check module 214 of FIG. 3 to the shift module 212. In other words, when the compression rate check module 214 determines that the compression rate of the source data 10 is smaller than the predetermined compression rate in the lossy mode, the compression rate check module 214 may transmit the source data 10 to the shift module 212 to achieve the predetermined compression rate. In this case, the maximum QP flag may be represented as 1. In the opposite case, the maximum QP flag may be 0. However, exemplary embodiments of the present disclosure are not limited thereto, and the maximum QP flag may be represented in the reverse manner.

The QP code may be a part for representing a QP used by the quantization module 213 of FIG. 3. The inverse quantization module 223 of the decoder 220 may decompress data compressed by the quantization module 213 using the QP code later.

The compressed data 20 of FIG. 16 may have a structure according to the separation mode 3. Therefore, each of a k value code and a QP code may exist for only one of a luma signal block Y, a first chroma signal block Cb, and a second chroma signal block Cr.

Since a compression rate is fixed in the lossy mode, the size of the compressed data 20, that is, the size (m1 bits) of the payload, may be fixed. Therefore, CRC bits may be fixed at a position obtained by subtracting the size of CRC bits from the fixed size.

Figure 17:
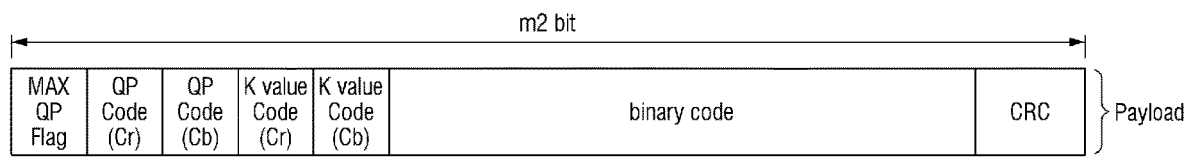
FIG. 17 is a diagram illustrating a structure of data compressed with loss by the image processing device according to some exemplary embodiments of the present disclosure.

FIG. 17 is a diagram illustrating a structure of data compressed with loss by the image processing device according to some exemplary embodiments of the present disclosure. Referring to FIG. 17, a payload may include a maximum QP flag, a binary code, a k value code, a QP code, and CRC bits. The compressed data 20 of FIG. 17 may have a structure of a combined block of a first chroma signal block Cb and a second chroma signal block Cr in the partial concatenation mode 2. Therefore, two k value codes and two QP codes may exist. Specifically, the payload may include a k value code (Cb) of the first chroma signal block Cb, a k value code (Cr) of the second chroma signal block Cr, a QP code (Cb) of the first chroma signal block Cb, and a QP code (Cr) of the second chroma signal block Cr.

The k value code (Cb) of the first chroma signal block Cb, the k value code (Cr) of the second chroma signal block Cr, the QP code (Cb) of the first chroma signal block Cb, the QP code (Cr) of the second chroma signal block Cr, and the binary code may be arranged in any sequence.

Figure 18:
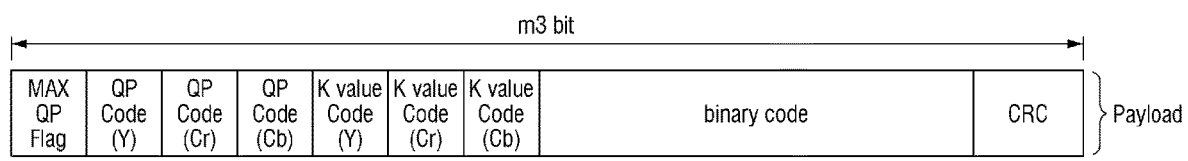
FIG. 18 is a diagram illustrating a structure of data compressed with loss by the image processing device according to some exemplary embodiments of the present disclosure.

FIG. 18 is a diagram illustrating a structure of data compressed with loss by the image processing device according to some exemplary embodiments of the present disclosure. Referring to FIG. 18, the payload may include a maximum QP flag, a binary code, a k value code, a QP code, and CRC bits. The compressed data 20 of FIG. 18 may have a structure of a combined block of a luma signal block Y, a first chroma signal block Cb, and a second chroma signal block Cr in the concatenation mode 1. Therefore, three k value codes and three QP codes may exist. Specifically, the payload may include a k value code of the luma signal block Y, a k value code (Cb) of the first chroma signal block Cb, a k value code (Cr) of the second chroma signal block Cr, a QP code (Y) of the luma signal block Y, a QP code (Cb) of the first chroma signal block Cb, and a QP code (Cr) of the second chroma signal block Cr.

The k value code of the luma signal block Y, the k value code (Cb) of the first chroma signal block Cb, the k value code (Cr) of the second chroma signal block Cr, the QP code (Y) of the luma signal block Y, the QP code (Cb) of the first chroma signal block Cb, the QP code (Cr) of the second chroma signal block C, and the binary code may be arranged in any sequence.

Figure 19:
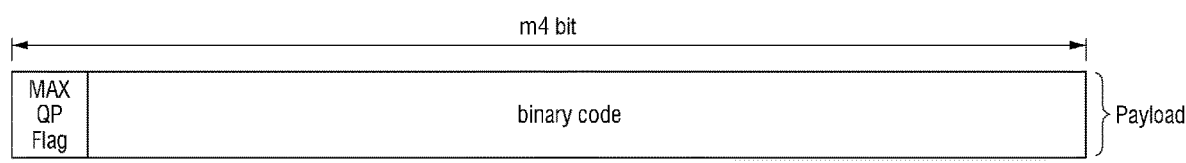
FIG. 19 is a diagram illustrating a structure of data compressed with loss by the image processing device according to some exemplary embodiments of the present disclosure.

Hereinafter, the image processing device according to some exemplary embodiments of the present disclosure will be described with reference to FIGS. 1 to 6 and FIG. 19. Descriptions of parts which have been described above will be shortened or omitted. FIG. 19 is a diagram illustrating a structure of data compressed with loss by the image processing device according to some exemplary embodiments of the present disclosure.

Referring to FIGS. 1 to 6 and FIG. 19, in the lossy mode, the payload may include only a binary code and a maximum QP flag without a k value code, a QP code, or CRC bits. The maximum QP flag may be 1, that is, the compressed data 20 may has been generated by the shift module 212.

In this case, the source data 10, rather than data which has been compressed by the quantization module 213 and the entropy encoding module 215, is directly compressed through a shift calculation. Therefore, neither a k value code nor a QP code exists. Further, since the source data 10 is directly compressed through only the shift calculation without being processed by the CRC module 216 of FIG. 3, CRC bits may not exist either.

The inverse quantization module 223 of FIG. 4 may restore the shift calculation later. At this time, decompression may be performed by shifting bits in an opposite direction in consideration of the maximum QP flag.

Figure 20:
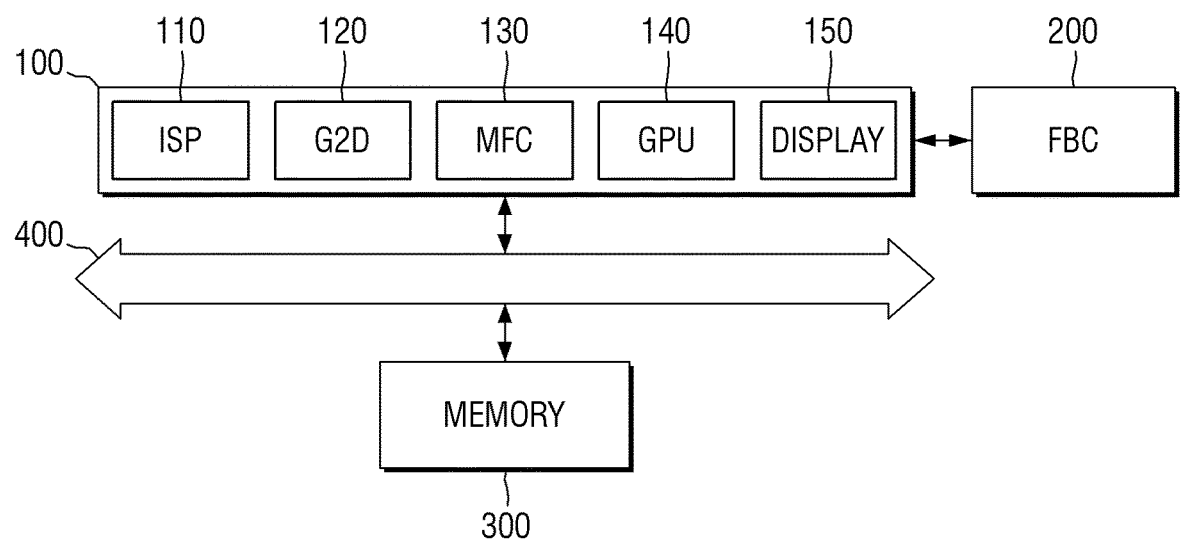
FIG. 20 is a block diagram illustrating an image processing device according to some exemplary embodiments of the present disclosure.
Figure 21:
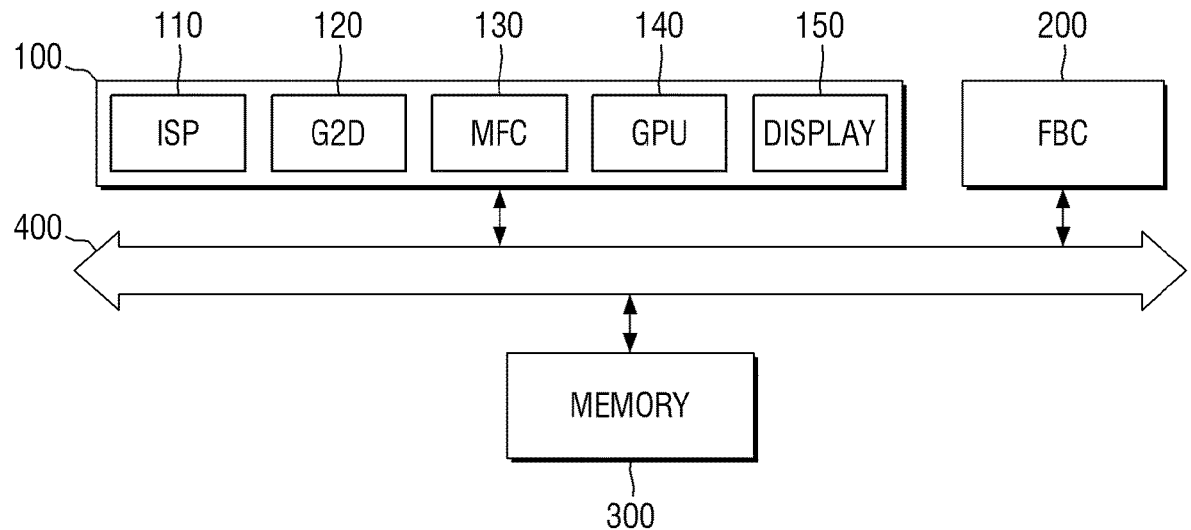
FIG. 21 is a block diagram illustrating an image processing device according to some exemplary embodiments of the present disclosure.
Figure 22:
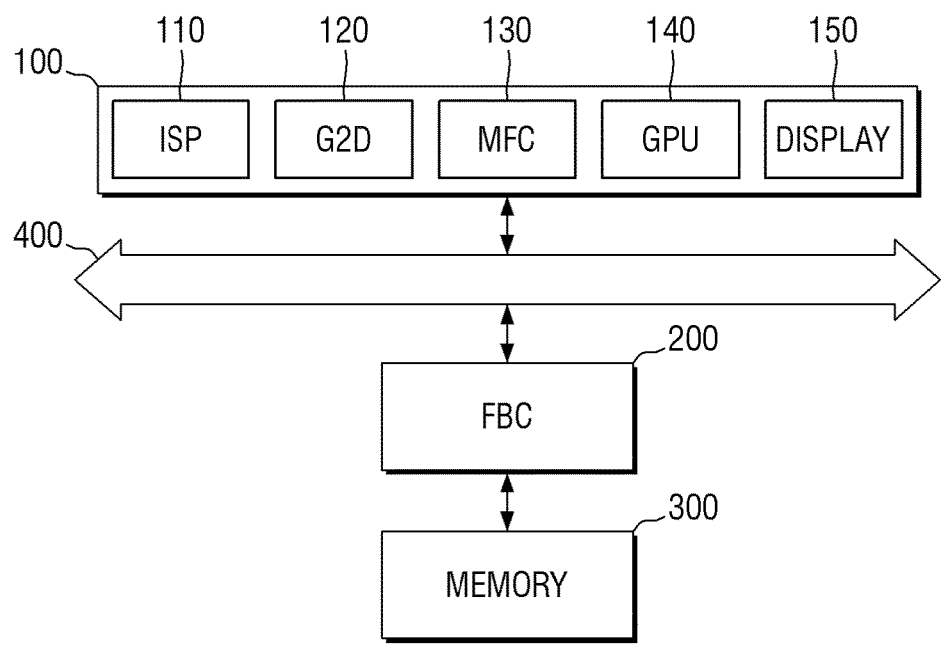
FIG. 22 is a block diagram illustrating an image processing device according to some exemplary embodiments of the present disclosure.

Hereinafter, image processing devices according to some exemplary embodiments of the present disclosure will be described with reference to FIGS. 20 to 22. Descriptions of parts which have been described above will be shortened or omitted. FIG. 20 is a block diagram illustrating an image processing device according to some exemplary embodiments of the present disclosure, and FIG. 21 is a block diagram illustrating an image processing device according to some exemplary embodiments of the present disclosure. FIG. 22 is a block diagram illustrating an image processing device according to some exemplary embodiments of the present disclosure.

Referring to FIG. 20, a frame buffer compressor 200 of an image processing device according to some exemplary embodiments of the present disclosure may be directly connected to multimedia IPs 100. The frame buffer compressor 200 may not be directly connected to a system bus 400. The frame buffer compressor 200 may perform the above-described compression and decompression every time the multimedia IPs 100 access a memory 300 through the system bus 400.

Referring to FIG. 21, a frame buffer compressor 200 of an image processing device according to some exemplary embodiments of the present disclosure may be directly connected to a system bus 400. The frame buffer compressor 200 may not be directly connected to multimedia IPs 100, but the frame buffer compressor 200 and the multimedia IPs 100 may be connected to each other through the system bus 400.

In this exemplary embodiment of the present disclosure, the frame buffer compressor 200 is not separately connected to the multimedia IPs 100 but may be connected to the multimedia IPs 100 through the system bus 400. Therefore, a hardware configuration is simplified, and operating speed may be increased.

Referring to FIG. 22, in an image processing device according to some exemplary embodiments of the present disclosure, a memory 300 and a system bus 400 may be connected to each other through a frame buffer compressor 200.

In other words, the memory 300 is not directly connected to the system bus 400 but is connected to the system bus 400 only through the frame buffer compressor 200.

In this exemplary embodiment of the present disclosure, the frame buffer compressor 200 is involved in every access to the memory 300. Therefore, it is possible to reduce errors and increase speed in data transmission.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:
1. An image processing device, comprising:
a frame buffer compressor configured to compress source data into compressed data having cyclic redundancy check (CRC) bits appended thereto, and further configured to decompress the compressed data into output data and use the CRC bits to check for errors in the output data, said frame buffer compressor comprising: (i) an encoder configured to compress the source data into the compressed data with the CRC bits appended thereto, and (ii) a decoder configured to decompress the compressed data into the output data; and
wherein said encoder comprises:
a prediction module configured to generate prediction data including reference data and residual data, from the source data;
an entropy encoding module configured to compress the prediction data according to a k value by entropy encoding the prediction data to thereby generate first compressed data; and
a CRC module configured to generate the CRC bits in response to the source data and append the CRC bits to the first compressed data.
2. The image processing device of claim 1, further comprising a multimedia device configured to generate the source data in response to raw data, and a memory device configured to store the compressed data.

3. The image processing device of claim 1, wherein said encoder further comprises:
a first mode selector configured to select whether the source data is to be compressed in a lossy mode or a lossless mode; and
a quantization module configured to quantize the prediction data using a predetermined quantization parameter.

4. The image processing device of claim 3, wherein the prediction data is transmitted to the quantization module and then to the entropy encoding module when the source data is being compressed in the lossy mode, but skips the quantization module when the source data is being compressed in the lossless mode.

5. The image processing device of claim 4, wherein said encoder further comprises a compression rate check module configured to check a compression rate of the first compressed data and record a header index in a header of the compressed data when the source data is being compressed in the lossy mode.

6. The image processing device of claim 5, wherein the CRC module is configured to determine a position of the CRC bit with reference to the header index, when the source data is being compressed in the lossless mode.

7. The image processing device of claim 5, wherein said encoder further comprises a shift module configured to perform a shift at a reference compression rate when the compression rate of the first compressed data checked by the compression rate check module is smaller than a reference compression rate.

8. An image processing device, comprising:
a multimedia device configured to generate source data by processing raw data, and further configured to receive and use output data;
a frame buffer compressor configured to compress the source data into compressed data having a cyclic redundancy check (CRC) bit appended thereto, and further configured to decompress the compressed data into the output data and verify an error(s) in the output data; and
a memory device configured to store the compressed data, and be accessible by the multimedia device;
wherein the frame buffer compressor operates in a first mode or a second mode different from the first mode, and
wherein the frame buffer compressor determines a first position of the CRC bit in the compressed data using a first method in the first mode, and a second position of the CRC bit in the compressed data using a second method different from the first method in the second mode.

9. The image processing device of claim 8, wherein the frame buffer compressor comprises:
an encoder configured to compress the source data into the compressed data; and
a decoder configured to decompress the compressed data into the output data.

10. The image processing device of claim 9, wherein the encoder comprises:
a prediction module configured to represent prediction data including reference data and residual data as the source data;
an entropy encoding module configured to compress the prediction data according to a k value by entropy encoding the prediction data and output first compressed data; and
a CRC module configured to generate the CRC bit by performing a calculation on the source data and add the CRC bit to an end of the first compressed data.

11. The image processing device of claim 10, wherein the encoder further comprises:
a first mode selector configured to determine whether to compress the source data in a lossy mode or a lossless mode; and
a quantization module configured to quantize the prediction data using a preset quantization parameter, and
wherein the prediction data is transmitted to the quantization module and then the entropy encoding module in the lossy mode and is transmitted directly to the entropy encoding module in the lossless mode.

12. The image processing device of claim 11, wherein the encoder further comprises a compression rate check module configured to check a compression rate of the first compressed data and record a header index in a header of the compressed data in the lossy mode.

13. The image processing device of claim 12, wherein the CRC module determines a position of the CRC bit with reference to the header index in the lossless mode.

14. The image processing device of claim 12, wherein the encoder further comprises a shift module configured to perform a shift at a reference compression rate when the compression rate of the first compressed data checked by the compression rate check module is smaller than the reference compression rate.

15. The image processing device of claim 11, wherein the decoder comprises:
a second mode selector configured to determine whether the compressed data has been compressed in the lossy mode or the lossless mode;
an entropy decoding module configured to entropy decode the compressed data according to the k value and output first output data;
a prediction compensation module configured to restore the output data using the reference data and the residual data included in the first output data; and
a CRC check module configured to generate a comparative CRC bit by performing a calculation on the output data.

16. The image processing device of claim 15, wherein the second mode selector separates a first CRC bit from the compressed data and transmits the first CRC bit to the CRC check module, and
wherein the CRC check module compares the first CRC bit with the comparative CRC bit and makes an error mark on the output data when the first CRC bit differ from the comparative CRC bit.

17. An image processing device comprising:
a multimedia Intellectual property (IP) configured to generate source data by processing raw data and receive and use output data;
a frame buffer compressor configured to compress the source data into compressed data and decompress the compressed data into the output data; and
a memory configured to store the compressed data and be accessed by the multimedia IP,
wherein the frame buffer compressor operates in a lossy mode or a lossless mode,
wherein the compressed data compressed in the lossless mode includes a first payload and a first header in which a header index indicating a compression rate of the first payload is recorded, wherein the compressed data compressed in the lossy mode includes only a second payload compressed according to a fixed compression rate, wherein the first and second payloads include first and second CRC bit, respectively, wherein a position of the first CRC bit varies according to the header index, and wherein a position of the second CRC bit is fixed.

18. The image processing device of claim 17, wherein a size of the first payload is n times (where n is an integer) a burst length and, wherein the position of the first CRC bit is h×BL-N, where h is the header index, BL is the burst length, and N is a size of the first CRC bit.

19. The image processing device of claim 17, wherein the first payload includes a first binary code obtained by compressing the source data through entropy coding, a first k value code indicating a k value of the entropy coding for the first binary code, and the first CRC bit, and wherein the second payload includes a second binary code obtained by compressing the source data through entropy coding, a second k value code indicating a k value of the entropy coding for the second binary code, and the second CRC bit, wherein the second binary code is quantized with a preset quantization parameter, and wherein the second payload includes a quantization parameter code indicating the quantization parameter of the second binary code.

20. The image processing device of claim 17, wherein the source data is encoded in a YUV format and includes a luminance signal block, a first chrominance signal block, and a second chrominance signal block.

* * * * *